US007788584B2

(12) United States Patent
Kenna et al.

(10) Patent No.: US 7,788,584 B2
(45) Date of Patent: Aug. 31, 2010

(54) COMPUTER-IMPLEMENTED METHOD, SYSTEM, AND PROGRAM PRODUCT FOR HIDING COLUMNS IN AN ELECTRONIC TABLE

(75) Inventors: Kimberly D. Kenna, Cary, NC (US);
John H. Fraleigh, Raleigh, NC (US);
Robert C. Leah, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 654 days.

(21) Appl. No.: 11/196,108

(22) Filed: Aug. 3, 2005

(65) Prior Publication Data

US 2007/0033518 A1 Feb. 8, 2007

(51) Int. Cl.
*G06F 3/00* (2006.01)
*G06F 17/00* (2006.01)
(52) U.S. Cl. .................. 715/722; 715/777; 715/788; 715/217; 715/218
(58) Field of Classification Search ............... 715/722, 715/777, 788, 217, 218
See application file for complete search history.

(56) References Cited

U.S. PATENT DOCUMENTS

| 5,706,449 | A |   | 1/1998 | Liu et al. |
| 5,809,317 | A | * | 9/1998 | Kogan et al. ............ 715/236 |
| 5,950,168 | A |   | 9/1999 | Simborg et al. |
| 6,055,550 | A | * | 4/2000 | Wallack .................. 715/229 |
| 6,205,453 | B1 |   | 3/2001 | Tucker et al. |
| 6,317,758 | B1 | * | 11/2001 | Madsen et al. ........... 715/220 |
| 6,437,812 | B1 | * | 8/2002 | Giles et al. ............. 715/853 |
| 6,711,715 | B1 | * | 3/2004 | Grealish ................ 715/206 |
| 6,889,359 | B1 | * | 5/2005 | Conner et al. ........... 715/207 |
| 7,275,207 | B2 | * | 9/2007 | Aureglia et al. .......... 715/214 |
| 7,546,523 | B2 | * | 6/2009 | Aureglia et al. .......... 715/218 |
| 2002/0143809 | A1 | * | 10/2002 | Bennett ................. 707/503 |
| 2002/0194095 | A1 |   | 12/2002 | Koren |
| 2003/0188257 | A1 | * | 10/2003 | Aureglia et al. .......... 715/503 |
| 2004/0107277 | A1 |   | 6/2004 | Levesque et al. |
| 2006/0070002 | A1 | * | 3/2006 | Guido et al. ............ 715/733 |
| 2006/0117051 | A1 | * | 6/2006 | Chin .................... 707/101 |
| 2007/0016872 | A1 | * | 1/2007 | Cummins et al. ......... 715/769 |
| 2007/0083541 | A1 | * | 4/2007 | Fraleigh et al. .......... 707/102 |
| 2007/0157124 | A1 | * | 7/2007 | Haug ................... 715/835 |
| 2009/0187816 | A1 | * | 7/2009 | Aureglia et al. .......... 715/218 |

* cited by examiner

*Primary Examiner*—William L Bashore
*Assistant Examiner*—David Phantana-angkool
(74) *Attorney, Agent, or Firm*—Lee Law, PLLC; Christopher B. Lee

(57) ABSTRACT

Under the present invention, when a user resizes or otherwise hides a column in the electronic table, a graphical indicia is displayed that represents the hidden column(s). If a user interacts with the indicia (e.g., by hovering a mouse/input device over it), a pop-window will be displayed that identifies the hidden column(s). The pop-up window can include icons representing each hidden column or an associated function. By manipulating the listing contained in the pop-up window, the user can un-hide the hidden table column(s), change their order in the electronic table, etc. In addition, the indicia can be formatted (e.g., boldfaced, colored, or otherwise altered) to reflect a status of an entry or cell in one of the hidden column (s).

26 Claims, 4 Drawing Sheets

| Name △ | Size | Type | Date Modified |
|---|---|---|---|
| CandleAndBSMNG | | Folder | 8/25/2004 9:09 PM |
| DevelopmentTools | | Folder | 11/2/2004 12:40 PM |
| Integration options | | Folder | 9/28/2004 1:25 PM |
| OmegamonEducation | | Folder | 12/10/2004 4:31 PM |
| v400 | | Folder | 12/6/2004 10:41 AM |

FIG. 2

| Status | Name | Display Item | Origin Node | Global Time |
|---|---|---|---|---|
| Open | NT_Service_Error | | Primary:KKENNA2NT | 02/09/05 17: |
| Open | NT_Service_Error | | Primary:KKENNA2NT | 02/09/05 14: |
| Open | NT_Invalid_Logo... | SYSTEM | Primary:KKENNA2NT | 02/08/05 16: |
| Open | NT_Log_Space_... | Application | Primary:KKENNA2NT | 02/07/05 14: |
| Open | NT_Log_Space_... | Security | Primary:KKENNA2NT | 02/07/05 14: |

FIG. 4

COMPUTER-IMPLEMENTED METHOD, SYSTEM, AND PROGRAM PRODUCT FOR HIDING COLUMNS IN AN ELECTRONIC TABLE

BACKGROUND OF THE INVENTION

1. Field of the Invention

The present invention generally relates to electronic tables. Specifically, the present invention provides a way to hide columns in an electronic table so that horizontal space is conserved.

2. Related Art

Practitioners in the art have established a number of methods to conserve horizontal space within an electronic table. The most common methods all deal with collapsing the table columns as a means to achieve increased viewing of other higher priority columns. There currently exist three common visual techniques to collapse a table column: (1) resize the table column, potentially to the point of being visually removed; (2) remove or hide a column or set of columns to gain horizontal space; and (3) set a minimum width for a table column. The first two techniques behave in a similar fashion, while the minimum width approach prevents a table column from being completely collapsed down.

Unfortunately, there are a number of shortcomings associated with each of each technique. In the first technique, there is no indication that the column is hidden. As such, a user must have knowledge that one or more columns is hidden between two of the columns are visible. If there is more than one column in the first technique, they must be added back in order. In the case of the second technique (which also applies to the first technique), there is no way to indicate status propagation to the column header because its visualization has been completely removed. Additionally, there is still no indication that the column exists and typically there is a separate dialog that the user must navigate into in order to choose which columns to show or hide. In the minimum width technique, the shortcomings are that: (a) the size is predetermined programmatically rather than leaving the decision to the user, and (b) the user cannot maximize their horizontal space due to this restriction.

SUMMARY OF THE INVENTION

In general, the present invention provides a method, system and program product for hiding columns in an electronic table. Specifically, under the present invention, when a user resizes or otherwise hides a column in the electronic table, a graphical indicia is displayed that represents the hidden column(s). If a user interacts with the indicia (e.g., by hovering a mouse/input device over it), a pop-window will be displayed that identifies the hidden column(s). The pop-up window can include icons representing each hidden column or an associated function. By manipulating the listing contained in the pop-up window, the user can un-hide the hidden table column(s), change their order in the electronic table, etc. In addition, the indicia can be formatted (e.g., boldfaced, colored, or otherwise altered) to reflect a status of an entry or cell in one of the hidden column(s).

A first aspect of the preset invention provides a computer-implemented method for hiding columns in an electronic table, comprising: hiding at least one column in the electronic table; and displaying a graphical indicia in the electronic table to represent the at least one column.

A second aspect of the present invention provides an electronic table, comprising: a set of visible columns; a set of hidden columns; and a graphical indicia displayed on the electronic table to represent the set of hidden columns.

A third aspect of the present invention provides a system for hiding columns in an electronic table, comprising: a system for hiding at least one column in the electronic table; and a system for displaying a graphical indicia in the electronic table to represent the at least one column.

A fourth aspect of the present invention provides a program product stored on a computer useable medium for hiding columns in an electronic table, the computer useable medium comprising computer program code for causing a computer system to perform the following steps: hiding at least one column in the electronic table; displaying a graphical indicia in the electronic table to represent the at least one column; and relocating the at least one column in the electronic table in response to a movement of the graphical indicia.

A fifth aspect of the present invention provides a method for deploying an application for hiding columns in an electronic table, comprising: providing a computer infrastructure being operable to: hide at least one column in the electronic table; and display a graphical indicia in the electronic table to represent the at least one column.

A sixth aspect of the present invention provides computer software embodied in a propagated signal for hiding columns in an electronic table, the computer software comprising instructions code for causing a computer system to perform the following functions: hide at least one column in the electronic table; display a graphical indicia in the electronic table to represent the at least one column; and relocate the at least one column in the electronic table in response to a movement of the graphical indicia.

Therefore, the present invention provides a computer-implemented method, system and program product for hiding columns in an electronic table.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which:

FIG. 2 shows an illustrative electronic table according to the present invention.

FIG. 4 shows another illustrative electronic table according to the present invention.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

The present invention provides a method, system and program product for hiding columns in an electronic table. Specifically, under the present invention, when a user resizes or otherwise hides a column in the electronic table, a graphical indicia is displayed that represents the hidden column(s). If a user interacts with the indicia (e.g., by hovering a mouse/input device over it), a pop-window will be displayed that identifies the hidden column(s). The pop-up window can include icons representing each hidden column or an associated function. By manipulating the listing contained in the pop-up window, the user can un-hide the hidden table column (s), change their order in the electronic table, etc. In addition, the indicia can be formatted (e.g., boldfaced, colored, or otherwise altered) to reflect a status of an entry or cell in one of the hidden column(s).

Under the present invention, the term "hide," when used with reference to a column of an electronic table, is intended to represent a partial hiding or a complete hiding of the column. Moreover, as used herein, the term "set" is intended to mean a quantity of one or more.

Figure 1:
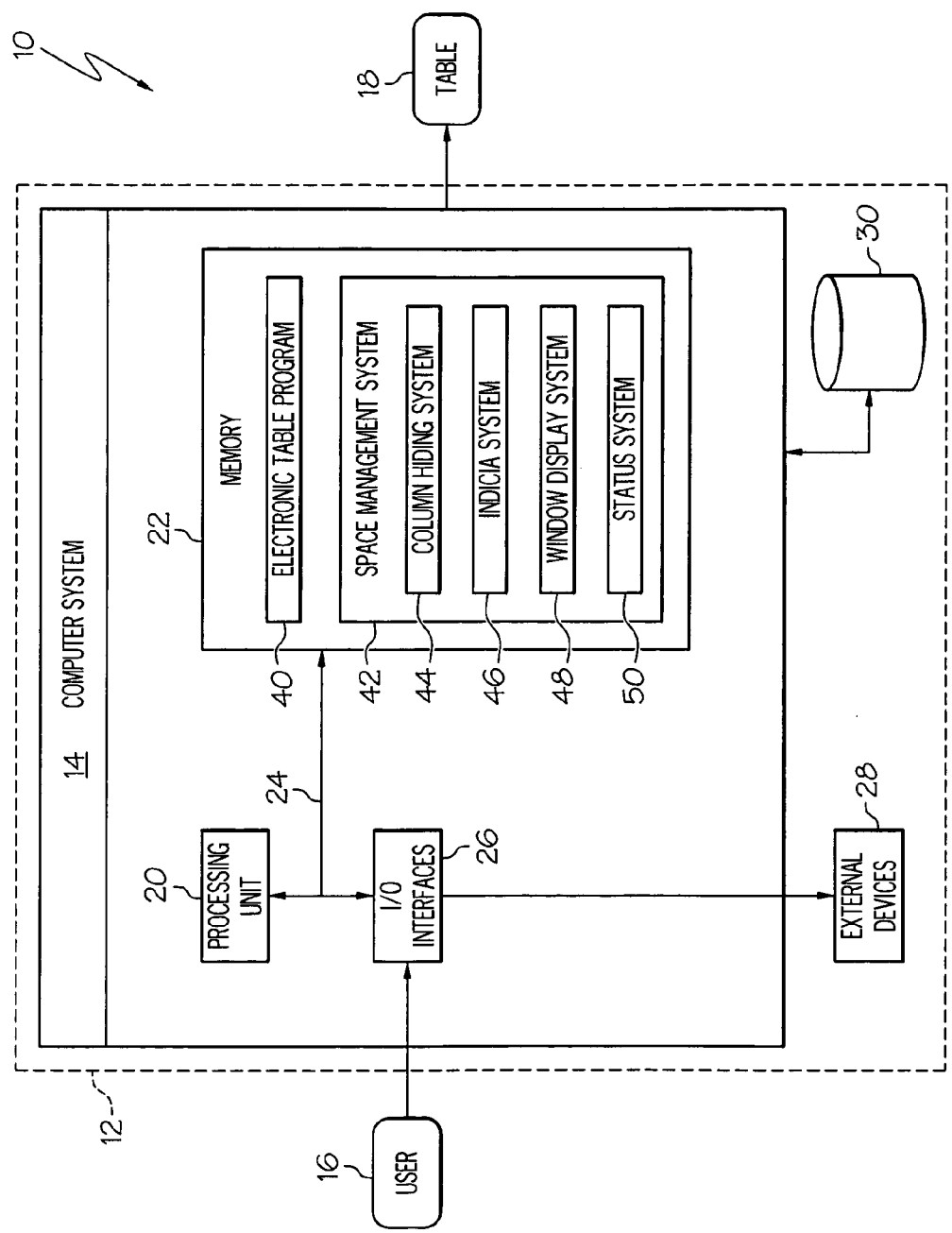
FIG. 1 shows an illustrative system for hiding columns in an electronic table according to the present invention.

Referring now to FIG. 1, a system 10 for hiding columns in an electronic table 18 according to the present invention is shown. Specifically, FIG. 1 depicts a system 10 in which a graphical indicia can be provided on/in electronic table 18 to represent one or more hidden columns. As depicted, system 10 includes a computer system 14 deployed within a computer infrastructure 12. This is intended to demonstrate, among other things, that the present invention could be implemented within a network environment (e.g., the Internet, a wide area network (WAN), a local area network (LAN), a virtual private network (VPN), etc., or on a stand-alone computer system. In the case of the former, communication throughout the network can occur via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer infrastructure 12 is intended to demonstrate that some or all of the components of system 10 could be deployed, managed, serviced, etc. by a service provider who offers to hide columns/optimize horizontal space in electronic table 18.

As shown, computer system 14 includes a processing unit 20, a memory 22, a bus 24, and input/output (I/O) interfaces 26. Further, computer system 14 is shown in communication with external I/O devices/resources 28 and storage system 30. In general, processing unit 20 executes computer program code, such as electronic table program/system 40, which is stored in memory 22 and/or storage system 30. While executing computer program code, processing unit 20 can read and/or write data to/from memory 22, storage system 30, and/or I/O interfaces 26. Bus 24 provides a communication link between each of the components in computer system 14. External devices 28 can comprise any devices (e.g., keyboard, pointing device, display, etc.) that enable a user to interact with computer system 14 and/or any devices (e.g., network card, modem, etc.) that enable computer system 14 to communicate with one or more other computing devices.

Computer infrastructure 12 is only illustrative of various types of computer infrastructures for implementing the invention. For example, in one embodiment, computer infrastructure 12 comprises two or more computing devices (e.g., a server cluster) that communicate over a network to perform the various process steps of the invention. Moreover, computer system 14 is only representative of various possible computer systems that can include numerous combinations of hardware. To this extent, in other embodiments, computer system 14 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 20 may comprise a single processing unit, or be distributed across one or more processing units in one or more locations, e.g., on a client and server. Similarly, memory 22 and/or storage system 30 can comprise any combination of various types of data storage and/or transmission media that reside at one or more physical locations. Further, I/O interfaces 26 can comprise any system for exchanging information with one or more external devices 28. Still further, it is understood that one or more additional components (e.g., system software, math co-processing unit, etc.) not shown in FIG. 1 can be included in computer system 14. However, if computer system 14 comprises a handheld device or the like, it is understood that one or more external devices 28 (e.g., a display) and/or storage system(s) 30 could be contained within computer system 14, not externally as shown.

Storage system 30 can be any type of system (e.g., a database) capable of providing storage for information under the present invention, such as table data, etc. To this extent, storage system 30 could include one or more storage devices, such as a magnetic disk drive or an optical disk drive. In another embodiment, storage system 30 includes data distributed across, for example, a local area network (LAN), wide area network (WAN) or a storage area network (SAN) (not shown). Although not shown, additional components, such as cache memory, communication systems, system software, etc., may be incorporated into computer system 14.

Shown in memory 22 of computer system 14 is electronic table program 40 and space management system 42. As further shown, space management system 42 includes column hiding system 44, indicia system 46, window display system 48 and status system 50. In general, electronic table system 40 is intended to represent any type of program that can generate electronic tables and/or spreadsheets. Examples include LOTUS 123, which is commercially available from International Business Machines Corp of Armonk, N.Y., and EXCEL, which is commercially available from Microsoft, Inc. of Redmond, Wash. As will be further described below, space management system 42 is provided under the present invention to help better manage horizontal space in an electronic table 18 (e.g., as generated by electronic table program 40). To this extent, space management system 42 could be implemented as a plug-in or the like to electronic table program 40. Alternatively (although not shown as such in FIG. 1), space management system 42 could be implemented as part of (within) electronic table program 40.

In any event, assume that user 16 is creating or manipulating electronic table 18. Further assume that user 16 wishes to stack or otherwise hide columns to conserve the amount of horizontal space being displayed. Under the present invention, when user 16 requests that one or more columns be hidden, that request will be received and/or executed by column hiding system 44. Thereafter, indicia system 46 will generate and display a graphical indicia in electronic table 18 to represent the hidden column(s).

Referring now to FIG. 2, this is shown in greater detail. Specifically, FIG. 2 depicts electronic table 18 having rows 60 and columns 62. Further, one or more columns have been hidden in electronic table 18 (and hence cannot be seen in FIG. 2). Under the present invention graphical indicia 64 is displayed in electronic table 18 to represent the hidden column(s). This provides a visual notification to user 16 (FIG. 1) that column(s) are in fact hidden. In a typical embodiment, graphical indicia 64 is positioned on table based on where hidden columns are physically located. Based on the position of graphical indicia in FIG. 2, it can be seen that one or more columns are hidden between the "Name" and "Size" columns. If other columns were hidden between, for example, between the "Size" and "Type" columns, another graphical indicia 64 could be generated and displayed between those columns by indicia system 46.

In addition, if user 16 interacts with graphical indicia 64, various functions can be provided under the present invention. For example, if user 16 moves graphical indicia 64 (e.g., using an input device such as a mouse), the corresponding hidden columns can be relocated in electronic table 18 accordingly. Thus, if user 16 moves graphical indicia 64 from its location shown in FIG. 2 to a location between the "Size" and "Type" columns, the hidden columns represented by graphical indicia 64 will be relocated to reside between the "Size" and "Type" columns. Still yet, if user 16 sweeps graphical indicia 64 with an input device (e.g., a mouse), a window (e.g., a pop-up window) can be displayed by window display system 48 (FIG. 1).

Figure 3:
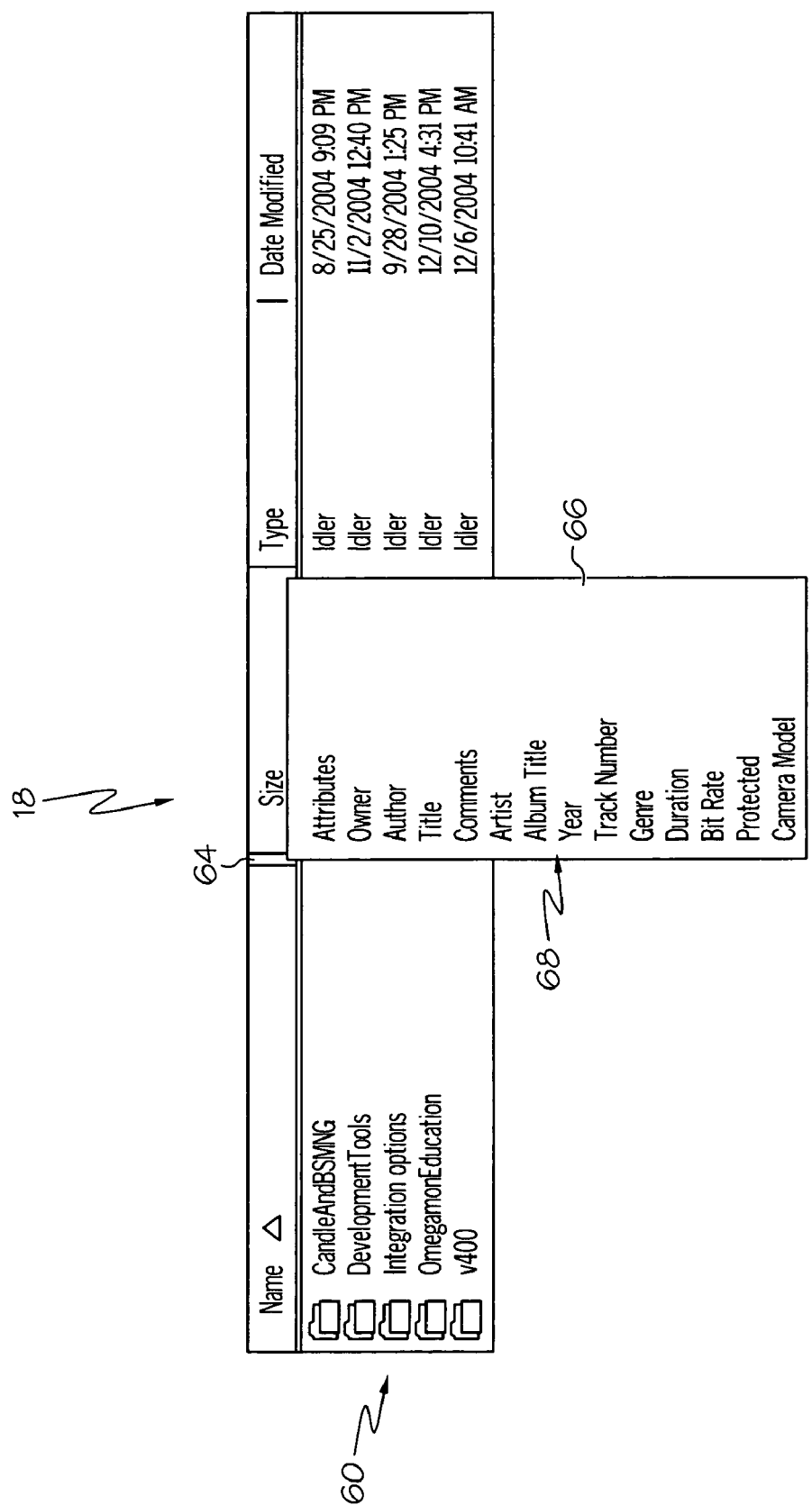
FIG. 3 shows another illustrative electronic table according to the present invention.

Referring to FIG. 3, this latter function is shown in greater detail. Specifically, FIG. 3 shows a pop-up window 66 that was generated and displayed by window display system 48 (FIG. 1) when user 16 (FIG. 1) interacted with graphical indicia 64. As depicted, window 66 includes several identifiers/entries 68 (textual names) that each correspond to a hidden column. Identifiers 68 could be the column headers for the hidden columns. Furthermore, each hidden column can be represented in window 66 with a corresponding icon (not shown). Under the present invention, user 16 can interact with the identifiers 68 in window 66 to provide other functionality. For example, if user 16 selects one of the identifiers 68 or icons, the corresponding hidden column can be un-hidden (e.g., by column hiding system 44). Alternatively, using drag and drop techniques in window 66, user 16 can change the order of the hidden columns in electronic table 18. Still yet, user 16 can drag an identifier 68 out of window 66 to make the corresponding hidden column visible. In addition, if a context menu or list of actions is available for a column when it is visible, the same menu or list could be made available when the column is hidden. For example, the context menu or list of actions could be provided as a cascading menu or the like off the identifier 68 for the column in window 66 by window display system 48.

Still yet, graphical indicia 64 could provide additional functionality under the present invention. For example, a formatting of graphical indicia 64 could be changed (via status system 50) to reflect a status of an entry of one of the hidden columns. This is shown in greater detail in FIG. 4. As shown, graphical indicia 64 is formatted (e.g., colored difference, boldfaced, enlarged, etc.). This represents a change in status (e.g., an error condition) related to an entry of electronic table 18. For example, if data contained in an entry of electronic table 18 caused an error condition to arise, that data could be similarly formatted. However, if the data was contained in an entry of a column that was hidden, user 16 could have no way of knowing that the status of the data had changed. In such a case, status system 50 (FIG. 1) will format graphical indicia 64 so that user 16 has a way of being notified of the status change. Along these lines, identifier 68 (FIG. 3) or an icon shown in window 66 (FIG. 3) for a hidden column could also be formatted by status system 50 to reflect the status change.

While shown and described herein as a method and system for hiding columns or managing space in an electronic table, it is understood that the invention further provides various alternative embodiments. For example, in one embodiment, the invention provides a computer-readable/useable medium that includes computer program code to enable a computer infrastructure to hide columns or managing space in an electronic table. To this extent, the computer-readable/useable medium includes program code that implements each of the various process steps of the invention. It is understood that the terms computer-readable medium or computer useable medium comprises one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 22 (FIG. 1) and/or storage system 30 (FIG. 1) (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a business method that performs the process steps of the invention on a subscription, advertising, and/or fee basis. That is, a service provider, such as a Solution Integrator, could offer to hide columns or manage space in an electronic table. In this case, the service provider can create, maintain, support, etc., a computer infrastructure, such as computer infrastructure 12 (FIG. 1) that performs the process steps of the invention for one or more customers. In return, the service provider can receive payment from the customer(s) under a subscription and/or fee agreement and/or the service provider can receive payment from the sale of advertising content to one or more third parties.

In still another embodiment, the invention provides a computer-implemented method for hiding columns or managing space in an electronic table. In this case, a computer infrastructure, such as computer infrastructure 12 (FIG. 1), can be provided and one or more systems for performing the process steps of the invention can be obtained (e.g., created, purchased, used, modified, etc.) and deployed to the computer infrastructure. To this extent, the deployment of a system can comprise one or more of (1) installing program code on a computing device, such as computer system 14 (FIG. 1), from a computer-readable medium; (2) adding one or more computing devices to the computer infrastructure; and (3) incorporating and/or modifying one or more existing systems of the computer infrastructure to enable the computer infrastructure to perform the process steps of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

We claim:

1. A computer-implemented method for hiding columns in an electronic table, comprising:

hiding at least one column in the electronic table;
displaying a graphical indicia that represents the at least one hidden column on a portion of a header row in the electronic table between two adjoining columns, both of the two adjoining columns being immediately adjacent to the at least one hidden column prior to the hiding and being immediately adjacent to each other subsequent to the hiding of the at least one hidden column; and
relocating the at least one column that is currently hidden in the electronic table in response to receiving a drag-and-drop operation performed on the graphical indicia alone.

2. The computer-implemented method of claim 1, wherein the at least one column is hidden pursuant to a user action.

3. The computer-implemented method of claim 1, further comprising displaying a window identifying the at least one column in response to an interaction with the graphical indicia.

4. The computer-implemented method of claim 3, wherein the window is a pop-up window displayed in response to an interaction between the graphical indicia and an input device.

5. The computer-implemented method of claim 3, wherein the window further includes a cascading menu representing a context menu available for the at least one column.

6. The computer-implemented method of claim 1, further comprising formatting the graphical indicia to change a visual representation of the graphical indicia to represent a status of an entry in one of the at least one column that is currently hidden.

7. The computer-implemented method of claim 6, where formatting the graphical indicia to change the visual representation of the graphical indicia to represent the status of the entry in one of the at least one column that is currently hidden comprises formatting the graphical indicia to indicate an error condition associated with the entry in the one of the at least one column that is currently hidden.

8. The computer-implemented method of claim 1, further comprising:
displaying a pop-up menu window in response to detection of user interaction with the graphical indicia, where the pop-up menu window includes a plurality of menu item identifiers;
detecting a user drag operation of one of the menu item identifiers outside of the pop-up menu window; and
re-displaying the at least one hidden column in response to detection of the user drag operation of the one of the menu item identifiers outside of the pop-up menu window.

9. A computer device including a computer readable storage medium having an electronic table stored thereon, the electronic table comprising:
a set of visible columns;
a set of hidden columns; and
a graphical indicia displayed on a portion of a header row in the electronic table that is between adjoining columns to represent the set of hidden columns, both of the adjoining columns being immediately adjacent to the set of hidden columns prior to the hiding and being immediately adjacent to each other subsequent to the hiding,
wherein the electronic table is adapted to relocate the set of hidden columns that are currently hidden in the electronic table in response to a relocation of the graphical indicia, the relocation of the graphical indicia being a drag-and-drop operation performed on the indicia alone.

10. The electronic table of claim 9, further comprising a window displayed in response to an interaction with the graphical indicia, wherein the window identifies the set of hidden columns.

11. The electronic table of claim 10, wherein the window is a pop-up window, and wherein the pop-up window contains an icon for each of the set of hidden columns.

12. The electronic table of claim 10, wherein the interaction with the graphical indicia is performed with an input device.

13. The electronic table of claim 9, wherein the graphical indicia is formatted to change a visual representation of the graphical indicia to represent a status of an entry in the set of hidden currently hidden columns.

14. A system for hiding columns in an electronic table, comprising:
a processor; and
a memory, the memory including:
a system for hiding at least one column in the electronic table;
a system for displaying a graphical indicia on a portion of a header row in the electronic table that is between adjoining columns to represent the at least one column, both of the adjoining columns being immediately adjacent to the at least one column prior to the hiding and being immediately adjacent to each other subsequent to the hiding, and
a system for relocating the at least one column that is currently hidden in the electronic table in response to a relocation of the graphical indicia, the relocation of the graphical indicia being a drag-and-drop operation performed on the indicia alone.

15. The system of claim 14, wherein the at least one column is hidden pursuant to a user action.

16. The system of claim 14, further comprising a system for displaying a window identifying the at least one column in response to an interaction with the graphical indicia.

17. The system of claim 16, wherein the window is a pop-up window displayed in response to an interaction between the graphical indicia and an input device.

18. The system of claim 16, wherein the window includes an identifier for each of the at least one column.

19. The system of claim 14, further comprising a system for formatting the graphical indicia to change a visual representation of the graphical indicia to represent a status of an entry in one of the at least one column that is currently hidden.

20. A program product stored on a computer useable storage medium for hiding columns in an electronic table, the computer useable medium comprising computer program code for causing a computer system to perform the following steps:
hiding at least one column in the electronic table;
displaying a graphical indicia on a portion of a header row in the electronic table that is between adjoining columns to represent the at least one column, both of the adjoining columns being immediately adjacent to the at least one column prior to the hiding and being immediately adjacent to each other subsequent to the hiding; and
relocating the at least one column in the electronic table in response to a movement of the graphical indicia, the movement of the graphical indicia being a drag-and-drop operation performed on the indicia alone.

21. The program product of claim 20, wherein the at least one column is hidden pursuant to a user action.

22. The program product of claim 20, wherein the computer useable medium further comprises program code to cause a computer system to perform the following step:
displaying a window identifying the at least one column in response to an interaction with the graphical indicia.

23. The program product of claim 22, wherein the window is a pop-up window displayed in response to an interaction between the graphical indicia and an input device.

24. The program product of claim 22, wherein the window includes an identifier for each of the at least one column.

25. The program product of claim 20, wherein the computer useable medium further comprises program code to cause a computer system to perform the following step: formatting the graphical indicia to change a visual representation of the graphical indicia to represent a status of an entry in one of the at least one column that is currently hidden.

26. A method for deploying an application for hiding columns in an electronic table, comprising:
   providing a computer infrastructure, which includes a computer device, being operable to:
   hide at least one column in the electronic table;
   display a graphical indicia on a portion of a header row in the electronic table that is between adjoining columns to represent the at least one column, both of the adjoining columns being immediately adjacent to the at least one column prior to the hiding and being immediately adjacent to each other subsequent to the hiding; and
   relocate the at least one column that is currently hidden in the electronic table in response to a relocation of the graphical indicia, the relocation of the graphical indicia being a drag-and-drop operation performed on the indicia alone.

* * * * *